R. STEWART.
LIQUID-FILTER.
No. 178,972. Patented June 20, 1876.
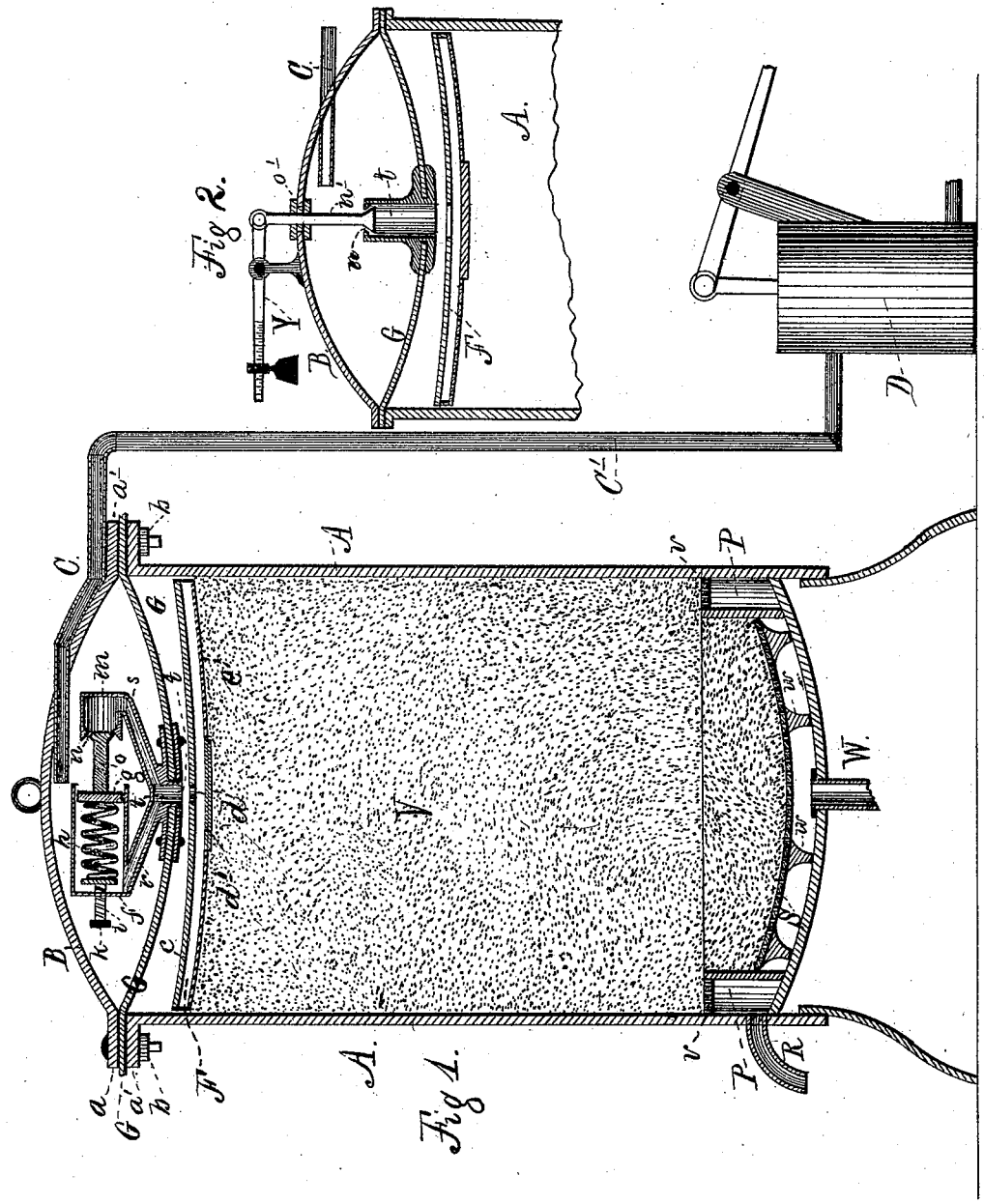
Witnesses:
Lewis Wilkinson
Jno. H. Manning
Inventor,
Robert Stewart
by W. L. Manson
Atty.

UNITED STATES PATENT OFFICE.

ROBERT STEWART, OF BROOKLYN, NEW YORK.

IMPROVEMENT IN LIQUID-FILTERS.

Specification forming part of Letters Patent No. 178,972, dated June 20, 1876; application filed May 16, 1876.

*To all whom it may concern:*

Be it known that I, ROBERT STEWART, of the city of Brooklyn, in the county of Kings and State of New York, have invented certain new and useful Improvements in Apparatus for Filtering Liquids, of which improvements the following is a specification:

This invention relates to that class of apparatus designed for the filtering of liquids under pressure, such apparatus usually consisting of an air-tight or hermetically-sealed vessel, which is compactly filled with filtering material, and provided with deflectors, perforated diaphragms, and with suitable induction and eduction pipes; also with a forcing apparatus, by means of which liquids are introduced under great pressure into and forced through the filtering material contained in the vessel, and discharged therefrom in a supposed purified state.

The invention consists in the introduction, into such an apparatus, of an adjustable double diaphragm, a flexible diaphragm provided with suitable valve devices, operating under and by means of the pressure of the liquid thereon, thereby governing the flow of the liquid and the movement of the adjustable diaphragm; also, in the provision of a chamber in the base of the apparatus or vessel for the purpose of receiving any unfiltered liquid that might pass outside of the filtering material at the walls of the vessel, and from which chamber it may be withdrawn from time to time, and again passed through the filter, all of which novel arrangement of parts, their construction, application, and operation, will be hereinafter fully pointed out and described.

In the drawings, which form an essential part of this specification, Figure 1 represents a sectional elevation of a filtering apparatus in which is fully embodied my invention; and Fig. 2 is a sectional view, showing certain modifications of the same.

Similar letters of reference found in the two figures of the drawings will locate and point out corresponding parts.

The present method of constructing apparatus for filtering liquids under pressure, as is well known to those versed in their construction and use, consists, usually, in the provision of an air-tight vessel, into which there is introduced proper filtering material, which is compressed as much as possible. Above this material a perforated diaphragm is usually placed and bolted to the sides of the vessel, this for the purpose of retaining the filtering material in place. Above this diaphragm a concave cap or cover is applied to the vessel, thus leaving an open chamber, into which the liquid to be purified is introduced through a suitable induction-pipe passing therefrom through the perforated diaphragm into the filtering material beneath, and making its exit through an eduction-pipe located at a suitable point in the base of the vessel.

This is the general form of constructing filters, though the liquid is sometimes introduced through a pipe entering the sides or base of the vessel, and discharging direct into the filtering material, afterward passing out through the perforated diaphragm at the top of the vessel, and an eduction-pipe passed through the cover.

Other variations and modifications of construction have been and are made, but all operating on the general plan first described, and all such forms of apparatus are subject to the same difficulties in their operation.

In the practical use of these pressure-filters it has been found that the proper introduction of the filtering material, the compactness of its body, and its retention in place undisturbed are all important toward the perfect operation of the apparatus. But thus far, no matter how carefully this preparation of the filter was conducted, the results in their use have proven that the excessive pressure of the liquid passing through the perforated diaphragm into the filtering material soon formed a chamber between the two, this chamber being full of liquid and loose filtering material floating therein.

It has been found that a great tendency exists toward the formation of channels from this chamber to and down the sides of the walls of the vessel, and thence direct to the eduction-pipe. For this reason large quantities of unfiltered liquid pass through the vessel, and exit therefrom as impure as it entered. This same trouble exists in all other forms of pressure-filters, where the liquid is introduced centrally within the body of the filtering material, the liquid invariably seeking its outlet toward and along the walls of the vessel through open channels that necessarily form by such action. Many elaborate devices, consisting of deflectors, diaphragms, both solid and perforated, ledges and shelves, together with peculiarly-arranged induction and eduction pipes, have been arranged within the vessel, to control and direct the flow of the liquid through the body of the filtering material, and away from the walls of the vessel, in order to insure perfect filtration; but as yet none of these devices have succeeded in keeping the filtering material compact in its place, and preventing the formation of channels therein, through which the liquid passes untouched.

It is to radically cure these defects that I have made my present invention, the main purpose of which is to continually compress the filtering material by means of the force of the pressure of the liquid as it is introduced into the vessel. I accomplish this by means of a flexible diaphragm, which receives the full pressure of the liquid up to a stated point, the pressure being communicated to an adjustable or movable diaphragm beneath the flexible diaphragm, and resting upon the surface of the filtering material, the pressure exerted upon it preventing the filtering material from getting loose and keeping it in a compact mass. When the pressure reaches a stated point, a valve is opened thereby, and permits the fluid to enter the filtering material.

A represents a vessel capable of resisting great pressure, and constructed of the materials and in the manner usually adopted for such purposes. It is shown as cylindrical, but any other desired shape or form may be used. B is a cap or cover, curved in form, as shown. It is attached to the top of the vessel by means of a flange, $a$, the top of the vessel having a corresponding flange, $a'$, the two being securely bolted together by means of bolts $b$. C is the usual induction-pipe, which is introduced through the cover B, as shown. It is connected, by means of a pipe, $C'$, with a suitable forcing-pump, D.

Instead of the pump D being used, any other method of imparting force or pressure to the liquid may be adopted.

F represents an adjustable or movable diaphragm. It is constructed from metal, and double in form, its top C being solid, and provided at the center with an opening, $d$, while its base $e'$ is foraminated, except at the center, where a solid plate is introduced, forming a deflector, $d'$.

This double diaphragm fits the vessel closely, and may, if so desired, be provided with packing at its periphery, so as to prevent any liquid from passing between it and the walls of the vessel.

G is a flexible diaphragm, constructed from rubber, corrugated sheet metal, or other suitable flexible material, and it is secured in position by insertion between the flanges $a$ and $b$ of the cover and vessel. It also acts at this point in place of ordinary packing. It has attached at its center a pressure-gage and piston, and a valve actuated thereby, which governs and controls the flow of the liquid to and through it and the double diaphragm F. This pressure-gage consists of a cylinder, $f$, of suitable size, provided with piston $g$, which is controlled by the spiral spring $h$, the said spring being adjusted and set at any desired degree of pressure by means of the screw-shaft $i$ and nut $k$, or some suitable equivalent device.

Opposite to the center of the cylinder $f$ is a pipe, $m$, provided with a conical or other properly-shaped valve-seat, $n$, into which a valve, $o$, fits, said valve being attached to an arm extending from the piston $g$ in the cylinder $f$, and actuated thereby. The cylinder $f$ and pipe $m$ are provided with connecting-pipes $r$ and $s$, which meet and terminate in a pipe, $t$, which passes through two metal supporting-flanges at the center of the flexible diaphragm G. The metal flanges are of suitable strength to support the pressure-gage, pipes, and valve, and proper braces and guides attached thereto, (such devices are not shown in the drawings, being of any ordinary mechanical construction and application,) and are rigidly fastened to the flexible material by means of bolts or rivets, as shown. The pipe $t$ in the flexible diaphragm G may be elongated and project at the base sufficiently to enter into the opening $d$ in the adjustable diaphragm F, in order to insure the direct passage of the liquid into the chamber therein, or the two diaphragms may be rigidly connected together at that point.

The operation of this portion of the apparatus is as follows: The vessel A is completely filled with filtering material V, the adjustable double diaphragm F resting upon its surface, the flexible diaphragm G, with its pressure-gage, pipes, and valves, resting upon the diaphragm F, and retained in place, as previously described. The pressure-gage piston $g$ being set, by means of the spring $h$, to resist a stated and fixed pressure of liquid—for example, say a pressure of two hundred pounds to the square inch—the liquid to be filtered is then, by means of induction-pipe C, introduced into the chamber above the flexible diaphragm G. The pressure upon the said diaphragm at once forces it down upon the movable diaphragm F, the metal flange at the center of the diaphragm G resting over the opening $d$ in the top of diaphragm F, thus communicating the pressure to the adjustable diaphragm, forcing it down upon the surface of filtering material, and holding it in a solid compact mass both before and after the liquid enters it. The valve $o$ and piston $g$ being adjusted to resist a stated pressure of, say, two hundred pounds, as previously named, the valve, of course, remains closed until the said pressure is exceeded, when the piston at once retracts, opening the valve, when the liquid at once enters the pipe $m$, to and through pipes $s$ and $t$ in the flexible diaphragm G, to and through the opening $d$ in the upper part of the diaphragm F, when it strikes the deflector $d'$, which distributes it throughout the chamber in said diaphragm, from whence it passes through the perforations in the lower part thereof into the filtering material V, thence toward the base of the vessel, from whence it escapes by means of a suitably-located eduction-pipe.

It will thus be seen that the entire pressure exerted upon the liquid is, in turn, constantly exerted upon the adjustable diaphragm, and therefore upon the filtering material, keeping it in a solid compact mass.

It is obvious that should any channels form, or commence to form, therein, the pressure acting thereon would instantly close them up, and absolutely prevent their formation. After the valve $o$ is open, and the liquid in excess of the pressure at which the valve is set to open is passing through the apparatus, the pressure upon the piston $g$ is equalized by permitting the liquid to pass up through the pipe $r$ into the cylinder $f$ to the rear of the piston $g$, as shown.

In the base of the vessel, around its entire inner circumference, I form a chamber, P, whose top is covered with fine wire-cloth, cloth, perforated metal, or other suitable material that will pass liquids but retain the filtering material above it. A pipe or faucet, R, is connected with this chamber, passing through the side of the vessel, through which any liquid in the chamber P may be withdrawn. The office of this chamber is to receive any partially-filtered or unfiltered liquid that may percolate down the walls of the vessel between it and the filtering material. This chamber arrangement is applicable to all forms of filters now in use, and is in itself of great importance for the purposes named. A perforated diaphragm, S, is inserted in the base of the vessel between the walls of the chamber P, and is retained above the bottom by means of a series of legs or supports, $w$, thus forming a chamber beneath it, into which the liquid enters after passing through the filtering material, and is therefrom drawn or discharged through the eduction-pipe W, which is entered through the base of the vessel A, and conducted to any desired point of delivery.

A modification of the pressure-gage and valve apparatus is shown in Fig. 2, the vessel A, its cover, and arrangements of chambers and diaphragms at the base being the same as previously described; it is also provided with the double adjustable diaphragm F and flexible diaphragm G, both arranged for the same purposes as before stated. In this case the tube $t$, that passes through the center of the flexible diaphragm, is enlarged and lengthened, and provided with a valve, $n$, the lever $n'$ of which passes through a stuffing box, $o'$, in the cover B, and is connected to a weighted lever, Y, similar to a safety-valve, which controls and gages the amount of pressure necessary to be exerted before the valve $n$ opens and permits the liquid to pass down through the two diaphragms to the filtering material.

The construction of the pressure-gage and valve apparatus attached to the flexible diaphragm G may be varied in mechanical construction from that herein shown and described, and still effectually accomplish the purposes of my invention. I therefore do not confine myself or my invention to any specific form of construction; and while I prefer the form of apparatus herein shown, I shall use in connection with the flexible and adjustable diaphragms any system of valves and pressure-gages that will control the pressure and apply it up to a stated point or degree to the diaphragms and filtering material before admitting the liquid to the filtering material, and retain such pressure as long as the filter is in operation.

It is obvious that my invention is applicable to all the forms of pressure-filters, and that any and all of the old and well-known forms of diaphragms, deflectors, ledges, shelves, &c., may be inserted in the body of the vessel.

Having thus fully and accurately described my invention, what I claim as new and useful, and desire to secure by Letters Patent, is—

1. In an apparatus arranged for filtering liquids under pressure, the combination of the following elements: an air-tight and hermetically-sealed vessel, containing suitable filtering material; a suitable forcing apparatus; an induction-pipe for introducing the liquid, and adjustable foraminated diaphragm; a fixed flexible diaphragm, carrying an automatic spring-valve, operating by pressure of the liquid; and an eduction-pipe for the exit of the liquid, the whole arranged, applied, and operating substantially as and for the purposes as herein shown and set forth.

2. In a filtering apparatus arranged to operate under pressure, the combination of the following elements: an air-tight or hermetically-sealed vessel, containing filtering material; a suitable forcing apparatus; an induction-pipe for introducing the liquid; a flexible diaphragm, carrying an automatic spring-valve, operating by pressure of the liquid; a double adjustable diaphragm; a foraminated base diaphragm; and an eduction-pipe, through which the liquid exits, the whole arranged and operating substantially as herein shown and set forth.

3. The combination of the following elements: a filtering-vessel, A, hermetically sealed, containing filtering material V, forcing apparatus D, induction-pipe C, flexible diaphragm G, perforated base diaphragm S, adjustable diaphragm F, chamber P, with foraminated top, discharge-pipe R, and eduction-pipe W, the whole arranged and operating as and for the purposes herein shown and set forth.

4. In a filter arranged to operate under pressure, in combination with an air-tight vessel containing filtering material, and provided with the usual induction and eduction pipes, receivers and distributers, deflectors and diaphragms, and a forcing apparatus, the chamber P, having foraminated top, arranged and operating substantially as and for the purposes herein shown and set forth.

5. In a filter arranged to operate under pressure, in combination with an air-tight or hermetically-sealed vessel, containing filtering material, and provided with suitable induction and eduction pipes, the double adjustable diaphragm F, flexible diaphragm G, provided with cylinder $f$, pressure-gage $g$, valve $o$, pipe $m$, pipes $r$ and $s$, and tube $t$, the whole arranged and operating as and for the purposes as herein shown and set forth.

ROBERT STEWART.

In presence of—
  A. L. MUNSON,
  LEWIS WILKINSON.